Figure 1:
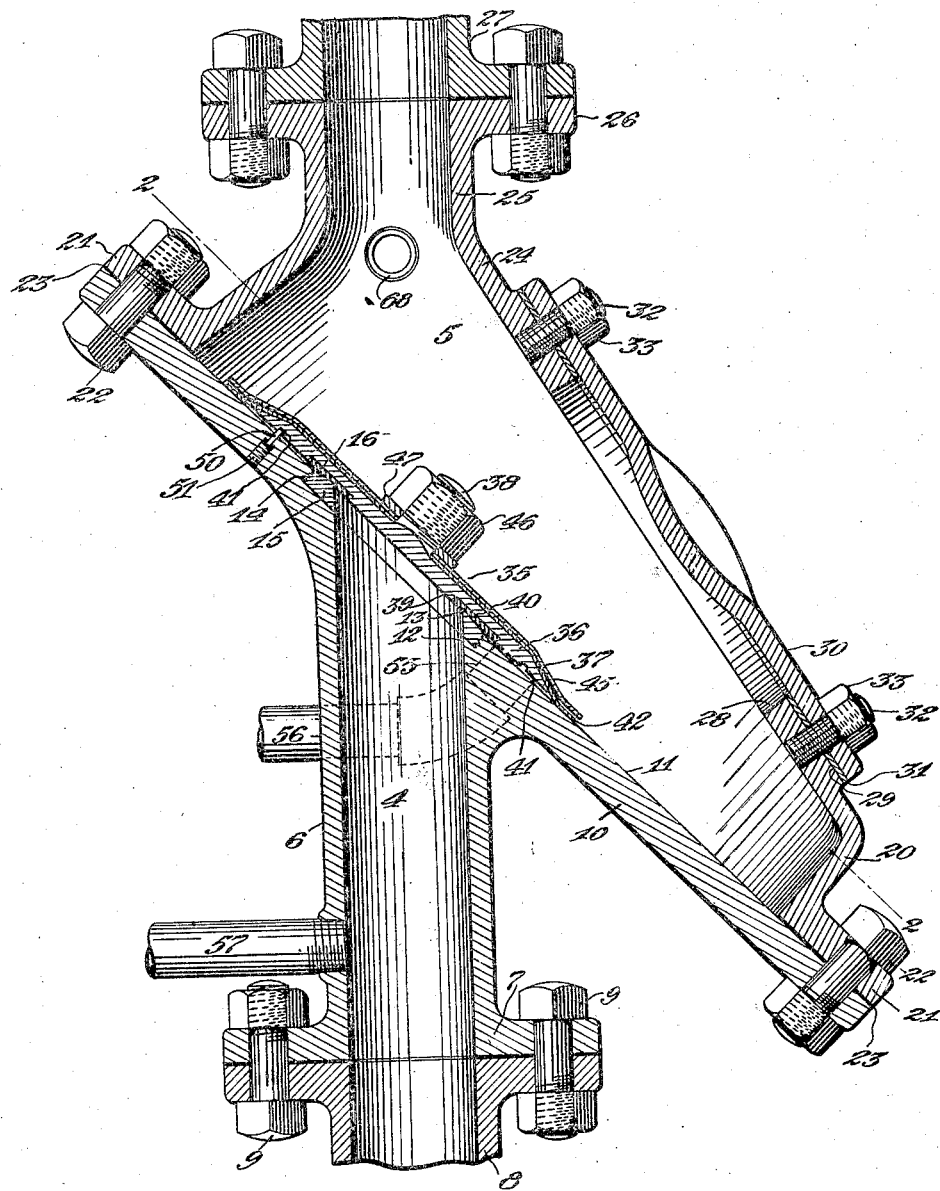

Jan. 4, 1927.

C. F. PECKHAM 1,613,478

DIFFERENTIAL VALVE

Filed Dec. 29, 1921    3 Sheets-Sheet 1

Inventor:
Charles F. Peckham
By
Arthur H. Armington
Attorney.

Jan. 4, 1927. 1,613,478
C. F. PECKHAM
DIFFERENTIAL VALVE
Filed Dec. 29, 1921   3 Sheets-Sheet 3

Inventor:
Charles F. Peckham
By
Arthur A. Arrington
Attorney

Patented Jan. 4, 1927.

1,613,478

UNITED STATES PATENT OFFICE.

CHARLES F. PECKHAM, OF PROVIDENCE, RHODE ISLAND.

DIFFERENTIAL VALVE.

Application filed December 29, 1921. Serial No. 525,576.

My invention relates to improvements in differential valves for use with the sprinkler systems of automatic fire-extinguishing apparatus. My improvements are directed particularly to a type of valve for use with dry-pipe systems, so called, in which a lesser pressure of air acting directly or indirectly upon the greater area of the delivery side of the valve-closure restrains the greater pressure upon the lesser area of the supply side of the closure.

One object of the improvement is to provide a valve of the type specified which will open automatically and completely upon the relief of pressure on its delivery side, and which will function promptly and positively to insure a direct, unobstructed flow of the fluid through the valve to the sprinkler system under full head.
Another object of the invention is to provide a valve which when once opened cannot be closed again by back pressure caused by the columning of the fluid in the delivery system.
Another object of the invention is to provide a valve which may be easily and conveniently reset in closed relation without particular skill or experience on the part of the operator.
Another object of the improvement is to simplify the structure of the valve by reducing the number of parts and eliminating complication of mechanism liable to derangement or getting out of order.
Another object of the improvement is to provide a valve structure which is less liable to become clogged, or rendered inoperative from corrosion or other cause.

Another object of the invention is to provide a valve which is economical to manufacture and easy to install.

Figure 2:
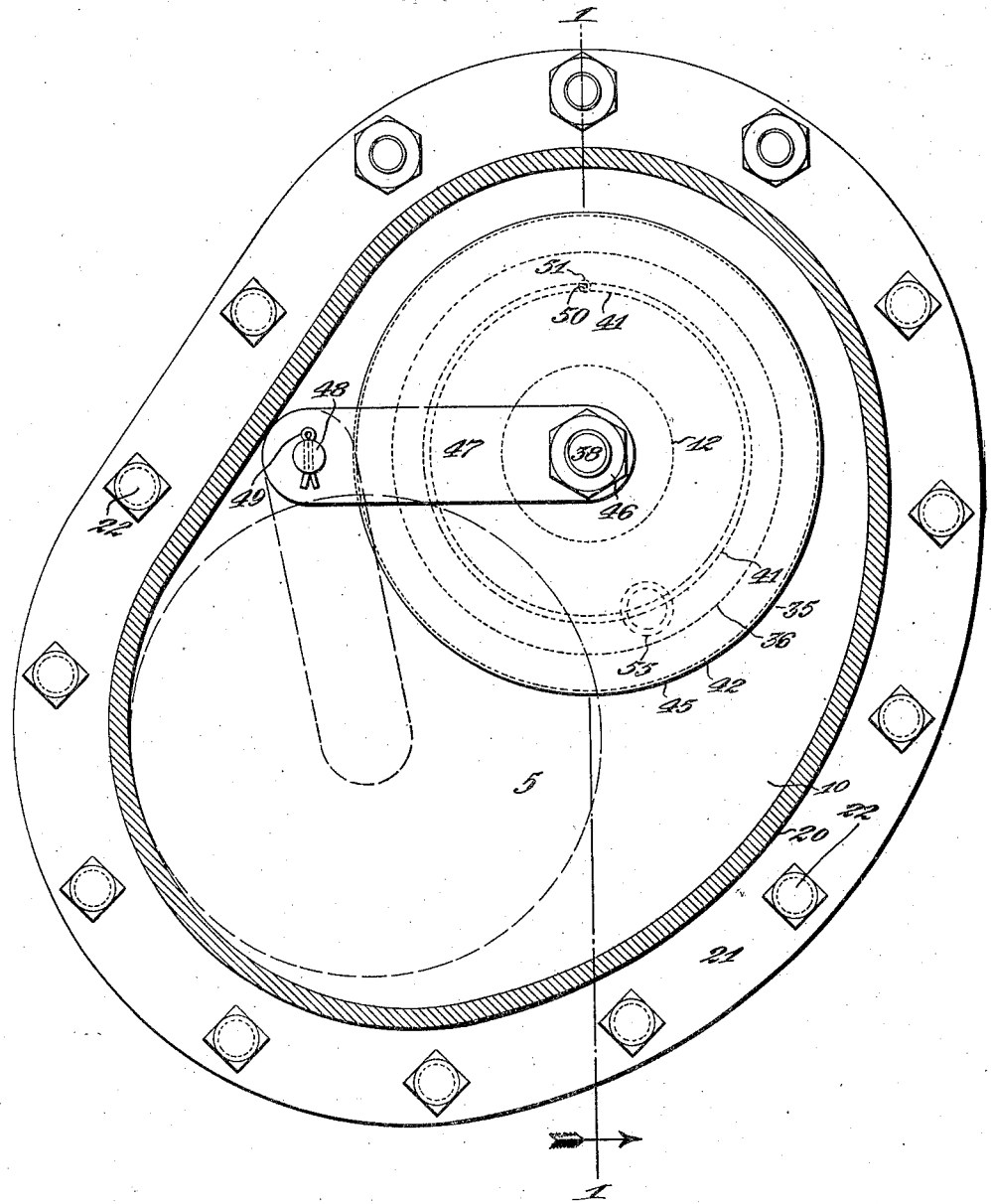
Figure 3:
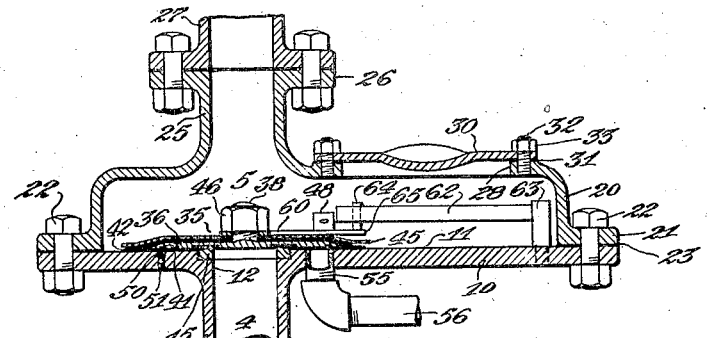
Figure 4:
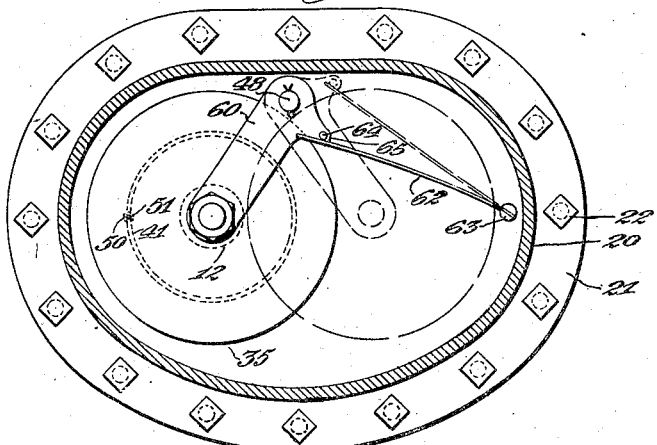

Further objects of the improvement are set forth in the following specification which describes a preferred embodiment of the invention as illustrated in the accompanying drawings. In the drawings:

Fig. 1 is a side elevation of my improved valve, showing it in vertical section on the line 1—1 of Fig. 2;
Fig. 2, a plan view of the delivery-chamber of the valve showing its side walls in section on the line 2—2 of Fig. 1;

Fig. 3, a vertical sectional view of a modified form of valve embodying the invention;

Fig. 4, a plan view of the delivery-chamber of the same; and

Figure 5:
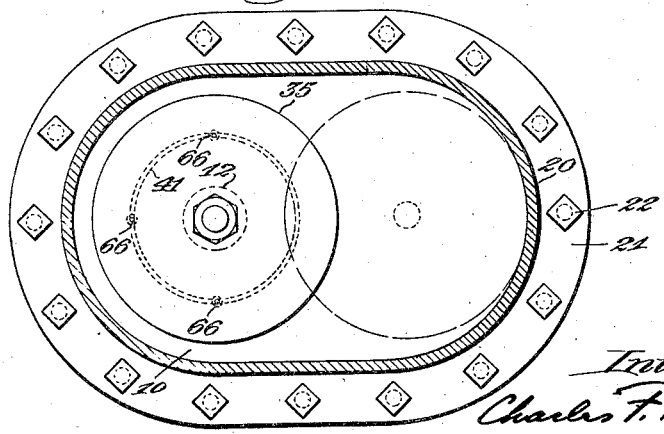

Fig. 5, a similar view showing a somewhat different arrangement of the valve-closure.

Referring first to Fig. 1, in the present embodiment my improved valve-mechanism is enclosed within a shell or casing comprising a supply-chamber 4 and a delivery-chamber 5. The supply-chamber 4 may consist of a tubular casing 6 having a flanged inlet 7 at its lower end adapted for connection with the flange of the water-main 8 by means of the usual arrangement of bolts 9. At the upper end of the casing 6 is a flat plate 10 which may be formed integral therewith and set at an angle to the axis of the throat of the casing. As shown in the drawings, the plate 10 is disposed at an angle of substantially forty-five degrees to the vertical axis of the throat for a purpose as later explained, but it is to be understood that the inclination of the plate may be varied and in certain instances it may be set in horizontal position, as shown in Fig. 3, where the valve is designed for operation without the aid of gravity.

The upper face 11 of the plate 10 is machined to provide a smooth plane surface across its area and the throat of the casing 6 is tapered on its sides to form a circular orifice or port 12 where the supply-chamber 4 opens into the delivery-chamber 5. The circular opening 12 is counterbored at 14 and interiorly threaded to adapt it to receive a ring 15 which is preferably constructed of hardened bronze or similar material of dense character. The upper face 16 of the ring 15 is formed with a slight bevel to raise its inner rim 13 above the face 11 of the plate 10, while providing a sharp edge which serves as the seat for the valve-closure, to be later described.

The delivery-chamber 5 consists in a casing 20 of substantially ovoid shape in plan view, see Fig. 2, and provided with a flanged rim 21 of the same contour. The flange 21 is of the same outline as the plate 10 which surmounts the supply-chamber casing 6 and is adapted to be secured thereto by means of suitable bolts 22 passing through holes therein. Usually a gasket 23 is placed between the face of the plate 10 and the flange 21 to insure a water-tight joint therebetween. The upper wall 24 of the casing 20 is substantially flat and inclined upwardly away from the plate 10, being formed at the top with a cylindrical neck 25 arranged in axial alinement with the orifice 12 of the supply-chamber 4. The neck 25 serves as the outlet for the valve and is provided with a flange 26 adapted to be bolted to the flange of a standpipe 27 connected to the sprinkler system. In the upper wall 24 of the casing 20 is a hand-hole 28 provided with a finished face 29 surrounding its rim. A suitable cover 30 fits against a gasket 31 on the face 29 and is secured in place by studs 32 and nuts 33.

The valve-gate or closure 35 for the passage 12 between the supply-chamber 4 and delivery-chamber 5 comprises the novel and peculiar structure as next described. Referring to Fig. 1, the main element of the valve-closure 35 consists in a metal disk 36 having its rim sharply beveled at 37 on its upper side and provided with a central post or stud 38. On the under side of the disk 36 is an annular recess 39, into which is fitted a flat ring or washer 40 of relatively soft metal which seats against the beveled edge of the ring 15. Outwardly beyond the seat-ring 40 is a narrow, annular groove 41 which is designed for a purpose as later explained. Overlying the top of the main valve-disk 36 is a circular gasket 42 constructed of flexible material, such as rubber. The gasket 42 conforms to the beveled rim 37 of the disk 36, and projecting beyond the edge thereof seats against the face of the plate 10 which is tinned to prevent sticking or close adhesion of the gasket thereto. Through this arrangement of the gasket 42 a water- and air-tight joint is secured around the edge of the valve-disk 36. Overlying the gasket 42 is a circular sheet-metal plate 45 which I term the atmospheric-disk. The atmospheric-disk 45 is clamped against the gasket 42 by means of a nut 46 screwed onto the central stud 38. The nut 46 screws down against the top of a flat arm 47, termed the radius-arm, extending radially across the top of the disk 36, see Fig. 2. The opposite end of the radius-arm 47 is pivoted to a post or stud 48 projecting above the plate 10, whereby to adapt the valve-closure 35 to hinge thereon as it swings across the opening 12. The arm 47 is free to slide up and down on the stud 48 and is held in place thereon by a cotter-pin 49. The outer rim of the disk 45 is dished to conform to the beveled rim of the main disk 36 while being spaced above the overlying rim of the gasket 42, the space therebetween being very slight so as not to allow the formation of an eddy from the delivery-chamber 5 while water is discharging through the orifice 12 and under the disk 36.

The valve-closure or gate 35 is located in position to adapt it to seat concentrically with the orifice or port 12 by means of a suitable latch or detent. As herein shown the detent-means consists of a pin 50 projecting above the face of the plate 10 and engaging the annular groove 41 on the under side of the disk 36. Preferably, the pin 50 projects from the end of a stud 51 screwed into the under side of the plate 10. The pin 50 is employed to locate the closure 35 in proper relation with its seat 15 in setting the valve in closed position, and the disk 36 is adapted to be released from the pin when it is raised to the slightest extent from its seat. I have found it expedient to construct this part of the mechanism so that the adjustment cannot be changed or tampered with, since to allow the pin 50 to project too far above the plate 10 would result in preventing the release of the valve-closure 35 from its detent. With this object in view the stud 51 is screwed into the plate 10 to set the pin 50 in proper relation with respect to the upper face of the plate and the slotted end of the stud is then filed off so that the stud cannot be turned to disturb its adjustment.

Tapped into the under side of the plate 10 is a nipple or pipe 55 opening into the delivery-chamber 5 beneath the valve-closure 35 within the confines of the overlying annulus of the gasket 42. The pipe 55 is connected to an alarm-valve, not herein shown, but arranged in the usual manner as well known to those versed in the art. The delivery-chamber 5 is thus provided with a vent which permits a flow of fluid to operate the alarm when the main valve is opened to supply the sprinkler system, or if leakage develops in either chamber.

Figs. 3 and 4 illustrate a modified form of the invention in which the valve casing is constructed in two parts, as before described, with the supply-chamber 4 having its top plate 10 arranged in horizontal position. The valve-closure 35 seats across the supply-orifice 12 in contact with the seat-ring 15, as before explained, and is located in position by the pin 50 engaging the groove 41 on the under side of the disk 36. The closure 35 is also arranged to swing on a radius-arm 60 hinged to a stud 48, but unlike the first described embodiment of the invention the closure is operated under spring pressure to initiate its movement across its seat. For this purpose I may employ any suitable arrangement of mechanism and, as illustrated in Fig. 4, I make use of a flat spring 62 anchored to a stud 63 projecting above the plate 10. The opposite end of the spring 62 bears against a pin 64 which projects from a lug 65 on the hub of the radius-arm 60, thus tending to swing the closure 35 into the position indicated by the dash lines in Fig. 4.

In Fig. 5 I have illustrated the valve as having a casing substantially the same as that shown in Figs. 1 and 2 and with its face-plate 10 arranged at an inclination to the horizontal. With this type of structure, as in the first described embodiment, the valve-closure 35 is adapted to be operated from the force of gravity to cause it to slide across the orifice or port 12 to remove it from its seat, but the radius-arm is dispensed with. That is to say, the valve-closure is entirely free from any connection with the valve casing and is adapted to slide across the top-plate 10 with its axis moving in a right line. With such a construction it is necessary to provide locating-means which will normally hold the closure from lateral movement in any direction and for this purpose I make use of three or more pins or dowels 66 which engage at different points around the groove 41 on the under side of the valve-disk 36.

Having now described the structure and arrangement of my improved valve, as embodied in several preferred forms, its method of operation will next be explained: As before stated, the flanged inlet 7 of the supply-chamber 4 is coupled to the water-main 8, and the outlet 25 of the delivery-chamber 5 is connected to the pipe 27 leading to the sprinkler system. The vent nipple 55 is connected by a pipe 56 leading to the alarm valve, not shown, and usually a small pipe 57 is tapped into the supply-chamber 4 and connected with a suitable pressure-gage. The water-main 8 is generally provided with a manually-operated gate or shut-off valve for shutting off the pressure and this is closed before adjusting the gate or closure of the differential-valve. With the shut-off closed the differential-valve is set for operation as follows: The hand-hole cover 30 is removed and the valve-closure 35 placed across the orifice or supply-passage 12, see Fig. 1, by swinging it on the axis of its radius-arm 47. It has been explained that the arm 47 is allowed to slide up and down on its pivot-stud or post 48 and this provision gives sufficient play to permit the disk 36 being lifted away from its seat-ring 15 to engage the latch or detent-pin 50 with its groove 41. When the disk 36 is engaged with the pin 50 in this manner the closure 35 will be held thereby and by the arm 47 to locate it concentrically of the port or orifice 12 with its ring 40 seating against the beveled rim of the ring 15. With the valve-closure 35 in this position, as shown in Figs. 1 and 2, the disk 36 will be spaced slightly above the face 11 of the plate 10, but it will be noted that the outer rim of the gasket 42 which overhangs the periphery of the disk will seat against the face 11. After the valve-closure 35 has been set in operative position in the manner as above explained the cover 30 is applied to the hand-hole 28 and bolted in place against its gasket 31 and the requisite amount of air pressure is applied to the delivery-chamber. The gate in the water-main is now opened and the valve is ready for operation.

It has been noted that my improved valve is designed for use particularly with dry-pipe systems in which the water is not admitted to the sprinkler pipes until the pressure in the system is relieved by the opening of one or more of the sprinkler-heads. The present type of valve is adapted to function without liquid in the delivery-chamber 5, but I have found it preferable to admit a small amount of water to said chamber to better seal the valve against its seat, particularly as regards the gasket or damper 42 which is liable to become dry and hard so that it loses its flexibility. It is therefore the preferred practice to fill the delivery-chamber 5 with water and this may be done in any convenient manner as, for instance, by the use of a suitable by-pass or funnel leading into the delivery-chamber as indicated at 68.

As has before been stated, the valve is designed to operate on the differential principle, that is with a lesser pressure acting upon the greater area of the delivery side of the valve-closure to restrain the greater pressure acting upon the lesser area of its supply side. Assuming for the purpose of this analysis that the area of the delivery side of the valve-closure is "8" and that of the port or orifice 12 opening from the supply-chamber "1", then the differential ratio of the valve is "8". Assuming further, for convenience of explanation, that the water pressure or head in the supply-chamber is 32 feet, then a head slightly in excess of 4 feet in the delivery-chamber will maintain the valve closed. It must be understood, however, that the pressure of the atmosphere must be added to each head, and taking this as equal approximately to 34 feet of water (actually 33.9 feet) then the full head in the supply-chamber would be 66 feet while that in the delivery-chamber would be 38 feet.

Now, when the sprinkler-system is opened the head in the delivery-chamber will be reduced to 34 feet (the approximate atmospheric pressure) while the head in the supply-chamber still remains at 66 feet. It is to be remembered, however, that the head on the under side of the disk 36 in the annular space between the seat 13 and the rim of the gasket 42 is 34 feet or the atmospheric pressure. The area of this annular space is approximately "8" minus "1", or "7", and the area-head will therefore be "7" times "34" or 238 feet. Adding to this the head in the throat or supply-passage 12, which is 66 feet, as before stated, gives a total area-head of 304 feet on the supply side of the closure 35. Just as the valve opens, therefore, there is an area-head of 272 feet on the delivery side of the closure and a head of 304 feet on its supply side, the difference being "32", which is the force acting under the disk to force it upwardly. In consequence of this the valve-closure 35 is raised off from its seat 13 and water commences to flow across the plate 10 under the disk 36 and gasket 42. It must not be supposed, however, that the closure is lifted violently or shot upwardly to the top of the delivery-chamber. On the contrary, the closure is only raised off from its seat to a slight extent, just sufficient to release it from the detent-pin 50. The reason for this is as follows: The instant that the valve is opened and the liquid starts to flow under the disk 36 the heads in the supply-chamber 4 and in the annular space under the disk between the seat 13 and the rim of the gasket 42 undergo a decided change in value, following the hydrodynamic law:—"The greater the velocity in a continuous stream of liquid the less the pressure." This loss of pressure head under the valve-closure is found by experiment to begin at the center of the circumference of the valve-throat, attaining its maximum value just beyond the edge of the orifice 12 and gradually diminishing as the stream approaches the rim of the disk 36. The loss of head at the rim of the orifice 12 has been determined by experiment to be approximately one and one-half times the head in the supply-chamber when water is flowing through the valve with the valve-closure held in close relation with its seat by atmospheric pressure alone.

Assuming that the atmospheric-disk 45 has an area of "9" and the annular space under the disk 36 between the seat 13 and its rim being in consequence "8", then the area-head in this space while water is flowing through the valve is "144", absolute, or "128" below atmospheric pressure. The head on the supply-surface of the disk, however, is "32" plus the absolute pressure "144" under the annulus, making a total of "176", which figure, in the present example, represents the force tending to drive the valve-closure away from its seat. It will therefore be obvious that since the pressure-head of "306" acting upon the delivery side of the valve-closure is greater by "130" than the pressure-head of "176" acting upon its opposite or supply-surface then the closure will be forced toward its seat. As a result of this difference in pressure the closure 35 approaches its seat 13 until the velocity of the flow of fluid across the seat is retarded to a point where the area-head under the annulus equals "274", at which juncture the closure is stabilized with water passing through the valve.

The above described action and reaction of pressure on the valve-closure is practically instantaneous and the disk 36 remains floating on a film of water passing under it so that it may be moved laterally in any direction by the slightest force. In the embodiment of the device illustrated in Figs. 1 and 2, and first described, the valve-closure 35 is set at an angle to the horizontal and consequently it will be influenced by gravity to slide across and away from its seat. That is to say, immediately the disk 36 is raised sufficiently to free its groove 41 from the detent-pin 50 the force of gravity will act upon the closure 35 to slide it across its seat and downwardly across the plate 10 into the position indicated by the dash lines in Fig. 2. The closure swings in an arcuate course about the pivot 48 of its radius-arm 47 and finally brings up against the wall of the delivery-chamber 5 which acts as a stop therefor.

The valve-closure slides across its seat with a considerable velocity which is gradually accelerated as the disk 36 becomes more eccentric to its seat, the flow of fluid toward the nearest point on its circumference being thereby increased and its reaction on the moving closure correspondingly augmented.

It has also been demonstrated by experiment that as the valve-closure 35 moves past the orifice or passage 12 a slight tilting action takes place so that the under surface of the disk 36 is inclined to the force of the stream which tends to further accelerate its motion. In consequence of this peculiar action the valve-closure is moved away from the supply-orifice with an exceedingly quick action so that the valve is opened practically instantaneously and its functioning is rendered more prompt for the purpose desired.

In the embodiment of the invention illustrated in Figs. 3 and 4 the valve-closure 35 seats across the orifice 12 in horizontal position with the pressure of the spring 62 acting to initiate its lateral movement to open the valve. A spring of very slight tension serves to perform this office since only very little pressure is required to start the motion of the closure, the force of the fluid flowing through the supply-orifice serving to continue its movement at an accelerated rate as above described.

The modified form of the valve shown in Fig. 5 is designed for operation with the valve-closure disposed at an inclination to the horizontal as in the first described embodiment. With this type of valve the lateral movement of the closure 35 is normally restrained by a plurality of detent-pins 66, but when the closure is raised off from its seat and released from the pins the force of gravity acts to displace it to one side of the supply-orifice. In this instance, however, the radius-arm is dispensed with and the closure floats on the film of water beneath it without being guided in its lateral movement.

It will be observed from the foregoing that my invention provides a novel and peculiar type of differential valve which functions in a new manner to produce an improved result. The valve is opened automatically upon the relief of pressure in the delivery-chamber and its action is immediate and positive without restraint or sluggishness from resistance liable to be encountered in overcoming the inertia of heavy parts. Furthermore, in opening the valve its closure is entirely removed from the valve seat and thus a direct and unobstructed passage is presented to the flow of the fluid. Moreover, the supply-orifice or passage cannot be closed or restricted by back-pressure on its closure due to columning of the water in the system or from other cause.

In addition to the above noted points it is further brought to attention that the mechanism of my improved valve is particularly simple in structure and arrangement, proof against derangement or getting out of order, and free from joints or hinges liable to become inoperative from corrosion.

I believe that my present improvement is the first disclosure of a differential valve having its closure adapted to be moved laterally across its seat when lifted away therefrom in the manner and for the purpose as herein described, and therefore I claim this feature broadly without restriction as to the structure and arrangement of the parts of the mechanism. Various modifications of structure and arrangement of the device other than those herein shown may be made without departing from the spirit or scope of the invention and, therefore, I claim:

1. In a differential valve, the combination of a casing having an inlet provided with a valve-seat, a valve-closure adapted to be held against the seat under the pressure in the casing acting against a greater area on the upper surface of the closure than its area opposed to the pressure through the inlet, and means for maintaining the closure normally in register with the seat, the closure being released from said means when it is raised away from the seat upon the relief of pressure in the casing, whereby to permit the closure to slide freely across the seat to open the valve.

2. In a differential valve, the combination of a casing having a delivery-chamber with an inlet-port opening thereinto, a valve-closure in said chamber adapted to seat across the port with a greater area of its surface opposed to the pressure in the chamber than the area opposed to the pressure through the port, and means for normally maintaining said closure laterally in position to register with the port, the closure being released from said means when it is lifted upon the relief of pressure in the chamber whereby to permit the closure to move across the port to open the valve.

3. In a differential valve, the combination with a casing having a supply-chamber and a delivery-chamber with a port communicating therebetween, of a valve-closure adapted to seat across the port with its greater area opposed to the lesser pressure in the delivery-chamber and a lesser area opposed to the greater pressure in the supply-chamber, and detent-means for holding said closure normally in register with the port while allowing it to be displaced laterally thereacross when the closure is lifted off from its seat.

4. In a differential valve, the combination with a casing having a supply-chamber and a delivery-chamber with a port communicating therebetween, of a closure adapted to seat across the port in the delivery-chamber, a radius-arm pivoted at the side of the port and connected with the closure to adapt the latter to swing laterally across the port, and detent-means for maintaining the closure normally in register with the port.

5. In a differential valve, the combination with a casing having a supply-chamber and a delivery-chamber with a port communicating therebetween, of a closure adapted to seat across the port in the delivery-chamber, and a detent acting on the closure to maintain it normally in register with the port while being adapted for release by the lifting of the closure to permit the latter to move across the port to open the valve.

6. In a differential valve, the combination with a casing having a delivery-chamber and a circular supply-passage opening thereinto, of a disk in the delivery-chamber adapted to seat across the supply-passage and to be held in closed position with respect thereto by the pressure in the delivery-chamber acting against a greater area on the disk than the area opposed to the pressure in the supply-passage, and means for normally maintaining the disk in substantially concentric relation with the seat of the supply-passage while permitting the disk to move laterally thereacross when lifted off from the seat.

7. In a differential valve, the combination with a casing having a delivery-chamber with a supply-passage communicating therewith, of an annular seat in the supply-passage disposed at an inclination to the horizontal, and a closure adapted to rest against said seat and to be held in closed relation therewith by the pressure in the delivery-chamber acting against a greater area on the disk than the area opposed to the pressure in the supply-passage, said closure adapted to be influenced by gravity to move across the seat when lifted away therefrom.

8. In a differential valve, the combination with a casing having a delivery-chamber provided with an inclined bottom wall with a supply-orifice opening therethrough, of a closure adapted to seat across the supply-orifice and to be displaced therefrom by the action of gravity which causes the closure to slide across the bottom wall of the chamber when lifted free from the supply-orifice upon the relief of pressure in the delivery-chamber.

9. In a differential valve, the combination of a casing comprising a delivery-chamber provided with a bottom-plate having a supply-orifice opening therethrough, an annular raised seat surrounding the supply-orifice, a disk adapted to rest against the seat in spaced relation with the upper face of said bottom plate, a flexible annulus overhanging the perimeter of the disk to adapt it to seat against the face of the bottom plate, and a substantially inflexible annulus on the disk overlying the flexible annulus in spaced relation thereabove.

10. In a differential valve, the combination of a casing comprising a delivery-chamber having a flat bottom-plate with a supply-passage opening therethrough, an annular seat surrounding the supply-passage with its edge raised above the face of the bottom-plate, a disk-like closure adapted to rest against the raised edge of the seat, a flexible gasket overlying the disk and overhanging the perimeter thereof to provide an annulus adapted to seat against the face of the bottom plate, and an atmospheric-disk overlying the flexible gasket.

11. In a differential valve, the combination of a casing comprising a delivery-chamber having a flat bottom-plate with a supply-passage opening therethrough, an annular seat surrounding the supply-passage with its edge raised above the face of the bottom-plate, a disk-like closure adapted to rest against the raised edge of the seat, a flexible gasket overlying the disk and overhanging the perimeter thereof to provide a surrounding annulus adapted to seat against the face of the bottom-plate, and an atmospheric-disk overlying the gasket on the main disk and spaced thereabove to permit the gasket to flex.

12. In a differential valve, the combination of a casing comprising a delivery-chamber having a flat bottom-plate with a supply-passage opening therethrough, an annular seat surrounding the supply-passage with its edge raised above the face of the bottom-plate, a disk-like closure adapted to rest against the raised edge of the seat in concentric relation therewith while overlying the face of the bottom-plate in spaced relation therewith, a flexible annulus overhanging the perimeter of the closure to adapt it to seat against the face of the bottom-plate, and a substantially inflexible annulus overlying the flexible annulus in spaced relation thereabove.

In testimony whereof I affix my signature.

CHARLES F. PECKHAM.